United States Patent
Cai et al.

(10) Patent No.: US 6,845,995 B2
(45) Date of Patent: Jan. 25, 2005

(54) METHOD OF FORMING COMPRESSION GRIPPED BUSHING SYSTEM

(75) Inventors: Haimian Cai, Ann Arbor, MI (US); Xi Lin, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 119 days.

(21) Appl. No.: 10/290,774

(22) Filed: Nov. 8, 2002

(65) Prior Publication Data

US 2004/0090033 A1 May 13, 2004

(51) Int. Cl.⁷ .............................................. B60G 11/60
(52) U.S. Cl. ........................ 280/124.169; 267/189; 267/276; 267/277; 280/124.165; 280/124.166; 280/124.177; 280/124.178
(58) Field of Search .................. 280/124.101, 124.102, 280/124.13, 124.149, 124.152, 124.165, 124.166, 124.169, 124.177, 124.178, FOR 146, FOR 157, FOR 172, FOR 173, FOR 174, FOR 178, FOR 180; 267/189, 276, 277

(56) References Cited

U.S. PATENT DOCUMENTS

| | | | |
|---|---|---|---|
| 2,078,367 A | * | 4/1937 | Boor ........................ 267/189 |
| 2,275,637 A | * | 3/1942 | McIntyre et al. ........... 267/189 |
| 2,446,621 A | | 8/1948 | Thiry |
| 2,448,769 A | | 9/1948 | Chamberlain |
| 2,808,270 A | | 10/1957 | Müller |
| 2,951,710 A | | 9/1960 | Willetts |
| 4,132,430 A | | 1/1979 | Bantle |
| 4,732,407 A | | 3/1988 | Oyama et al. |
| 4,740,012 A | | 4/1988 | Kondo et al. |
| 4,834,416 A | | 5/1989 | Shimoe et al. |
| 4,883,260 A | | 11/1989 | Kanda |
| 5,080,334 A | | 1/1992 | Mihara et al. |
| 5,190,269 A | | 3/1993 | Ikeda et al. |
| 5,224,790 A | | 7/1993 | Hein |
| 5,413,374 A | | 5/1995 | Pierce |
| 5,540,420 A | | 7/1996 | Luzsicza |
| 5,692,767 A | | 12/1997 | Kato |
| 5,843,264 A | | 12/1998 | Mabuchi et al. |
| 5,884,926 A | | 3/1999 | Muzio et al. |
| 5,887,859 A | | 3/1999 | Hadano et al. |
| 6,094,818 A | | 8/2000 | Ogawa et al. |
| 6,145,858 A | | 11/2000 | Foulquier |
| 6,286,821 B1 | | 9/2001 | Schaffer |

* cited by examiner

*Primary Examiner*—Eric Culbreth
(74) *Attorney, Agent, or Firm*—Brinks Hofer Gilson & Lione (57) ABSTRACT

A suspension bar assembly for an automotive vehicle includes a suspension bar having a bushing, a bushing retainer that exerts radially and axially compressive forces onto the bushing such that the bushing is in frictional engagement with the suspension bar, thereby preventing relative movement of the bushing and the suspension bar, and a mounting bracket that is adapted to connect the suspension bar to the automotive vehicle. A method of inducing a pre-load onto a bushing that supports a bar includes: providing a bar, placing a bushing onto the bar, placing a bushing retainer onto the bushing, and compressing the bushing axially and radially within the bushing retainer.

6 Claims, 9 Drawing Sheets

METHOD OF FORMING COMPRESSION GRIPPED BUSHING SYSTEM

BACKGROUND OF INVENTION

1. Technical Field

The present invention generally relates to a stabilizer bar for an automotive vehicle. More specifically, the present invention relates to the mounting of bushing onto a stabilizer bar that produces a frictional engagement between the bushing and the stabilizer bar as well as between the bushing and the bushing retainer.

2. Description of the Prior Art

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar. Accordingly, the stiffness, or spring rate, of the bushings affects the feel of the suspension of the vehicle.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

Because the stiffness of the bushing affects the vehicle dynamics, bushings having different stiffness are used in different vehicles. This requires the warehousing of different bushings to provide the varying stiffness needed for different vehicles. Further, after time the bushings lose some resiliency, thereby causing the feel of the suspension in the vehicle to change. In order to repair this condition, the bushing would typically have to be replaced, at significant cost.

A principle object of this invention is to provide a stabilizer bar assembly that utilizes common components, yet is able to provide varying stiffness for different vehicle applications.

It is also an object of this invention to provide a stabilizer bar assembly having bushings which frictionally engage the stabilizer bar to keep the bushings in position on the stabilizer bar, wherein the bushings are axially compressed onto the stabilizer bar such that the stiffness of the bushing can be adjusted by varying the axial force at which the bushing is compressed.

SUMMARY OF THE INVENTION

The disadvantages of the prior art are overcome by providing a stabilizer bar assembly, in accordance with the present invention, in which the stabilizer bar assembly includes a stabilizer bar having a bushing mounted thereon. The assembly further includes a bushing retainer that is in mechanical compressive engagement with the bushing such that the bushing is in frictional engagement with the stabilizer bar. A mounting bracket is adapted to connect the stabilizer bar to an automotive vehicle.

In a first aspect of the present invention the bushing retainer exerts a radial force onto the bushing such that the bushing is compressed into frictional engagement with the stabilizer bar.

In another aspect of the present invention, the bushing retainer exerts an axial compressive force onto the bushing such that the bushing is further compressed into frictional engagement with the stabilizer bar.

Still another aspect of the present invention is a method of inducing a pre-load onto a bushing that supports a stabilizer bar including: providing a stabilizer bar, placing a bushing onto the stabilizer bar, placing a cylindrical bushing retainer, compressing the bushing axially and radially within the bushing retainer.

Yet another aspect of the present invention is a method of inducing a pre-load onto a bushing that supports a stabilizer bar including: placing the bushing retainer about the stabilizer bar, injecting the bushing material, in a molten state, into the bushing retainer under pressure, and allowing the bushing material to cool and solidify within the bushing retainer.

The aspects of the present invention provide a stabilizer bar assembly that uses common components, yet can be adjusted for different vehicle applications, and further, allows the bushing assemblies on the stabilizer bar to be repaired after the bushings have lost some of their resiliency.

DETAILED DESCRIPTION OF THE PREFERRED EMBODIMENTS

Figure 1:
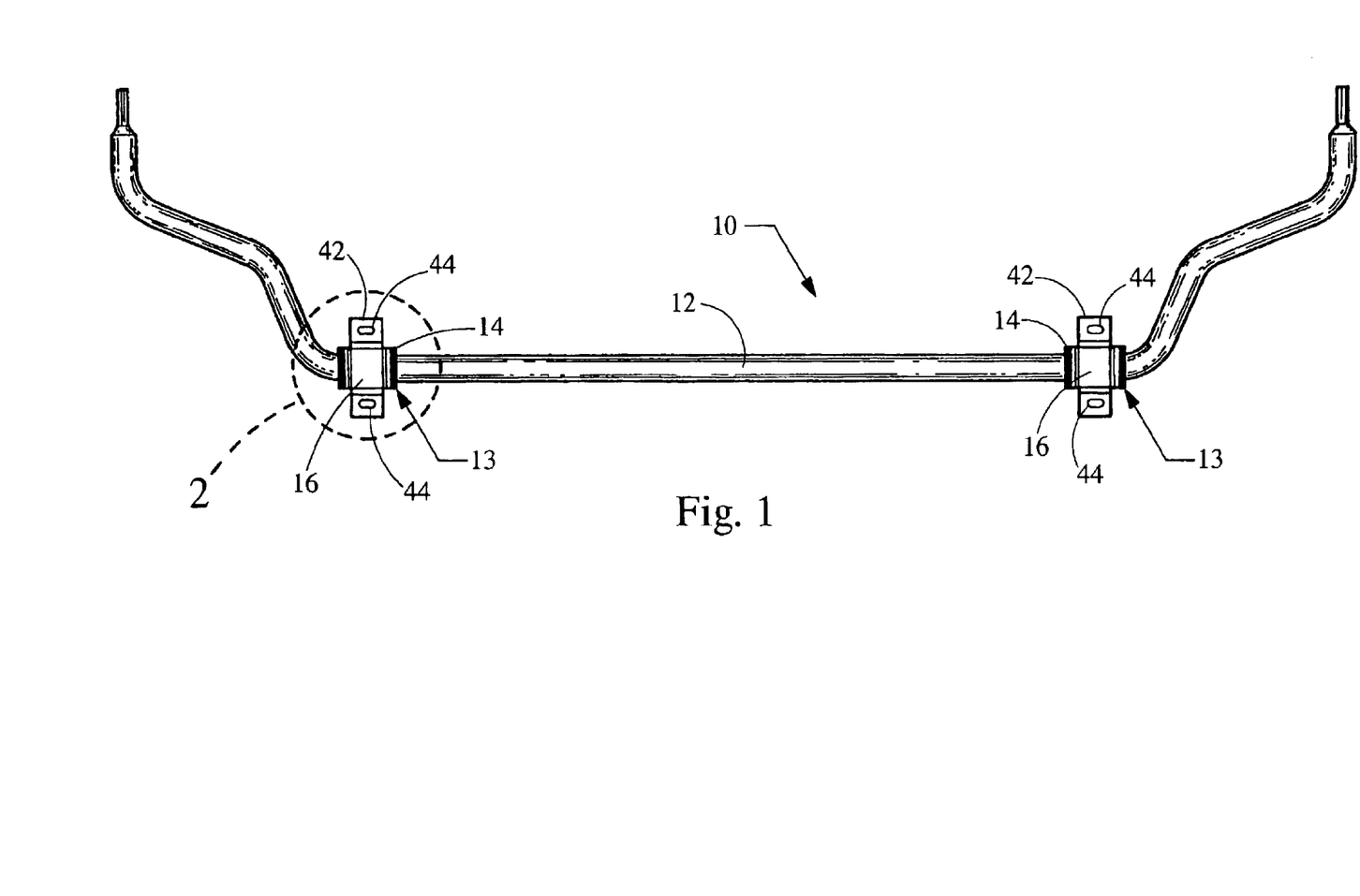
FIG. 1 is a plan view of a stabilizer bar of the present invention.
Figure 2:
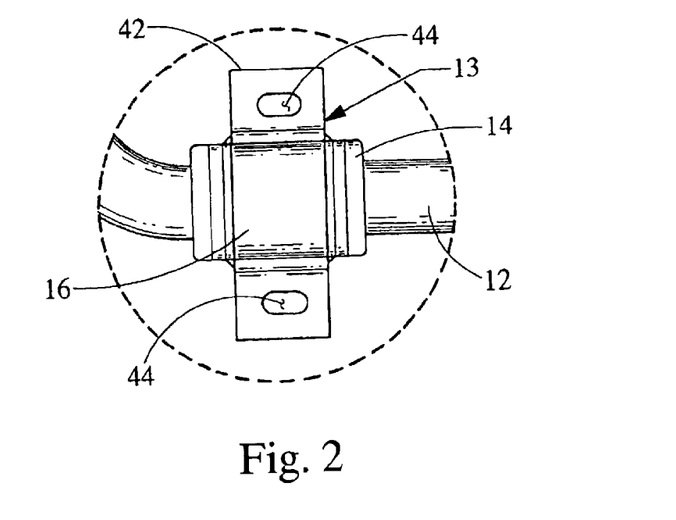
FIG. 2 is an enlarged view of the portion of the stabilizer bar shown in FIG. 1 enclosed by the circle numbered 2.
Figure 3:
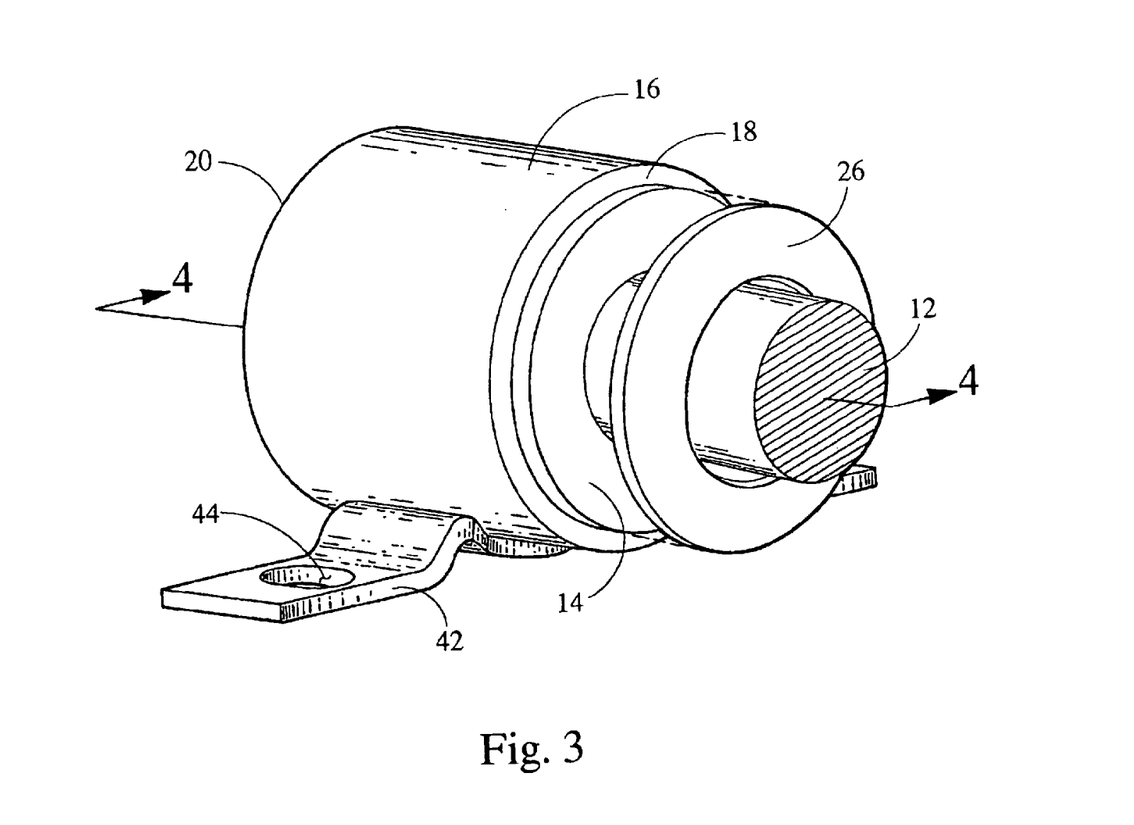
FIG. 3 is a perspective view of a first preferred embodiment before an end cap has been placed to the bushing retainer.

Referring to FIGS. 1 and 2, a stabilizer bar assembly for an automotive vehicle is shown generally at 10. The stabilizer bar assembly 10 includes a stabilizer bar 12 with at least one bushing assembly 13 mounted thereon. The stabilizer bar 12 is generally made from steel, and can be solid or hollow. It is to be understood, that the stabilizer bar 12 can be made from other suitable materials. The bushing assemblies 13 include a bushing retainer 16 that encompasses a bushing 14 and is in mechanical compressive engagement with the bushing 14 such that the bushing 14 is frictionally engaged with the stabilizer bar 12.

Figure 4:
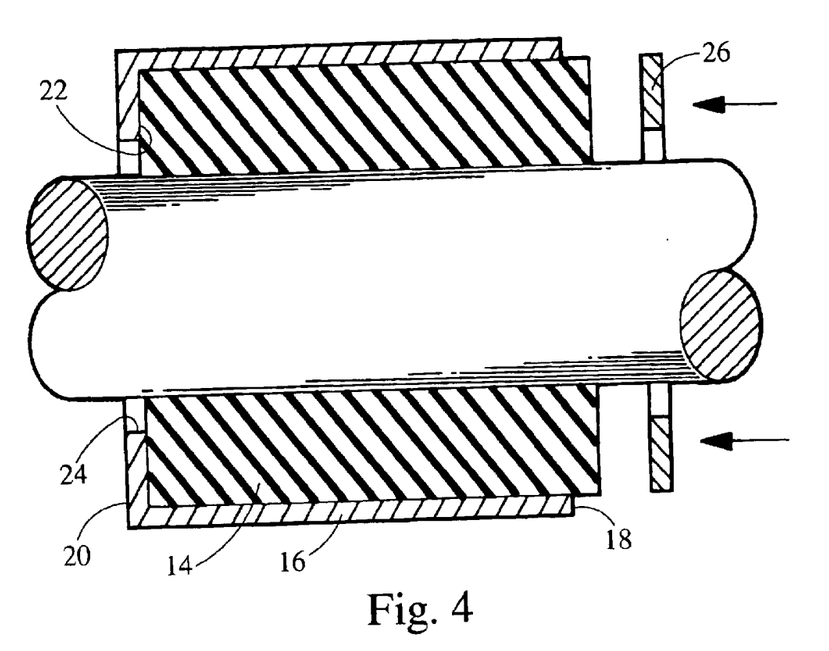
FIG. 4 is a sectional view taken along line 4—4 of FIG. 3.

The bushing 14 is made from an elastomeric material, such as rubber, or some other resilient material. Preferably, the bushing 14 is held onto the stabilizer bar 12 by friction alone. However, an adhesive can also be applied between the inner diameter of the bushing 14 and the stabilizer bar 12 to provide additional retention of the bushing 14 on the stabilizer bar 12. Once the bushing 14 is properly located on the stabilizer bar 12, the bushing retainer 16 is positioned about the bushing 14. Referring to FIG. 4, the bushing retainer 16 is generally sleeve shaped having a cylindrical outer surface and a cylindrical passage extending therethrough defining an inner diameter. The inner diameter of the bushing retainer 16 is large enough to accommodate the bushing 14.

Figure 5:
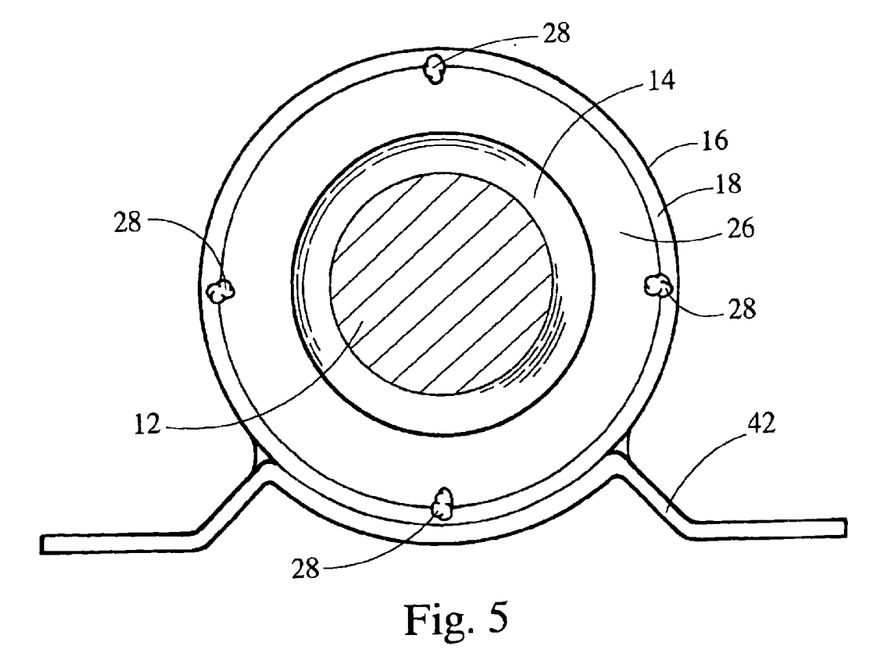
FIG. 5 is and end view of the first preferred embodiment after the end cap has been welded to the bushing retainer.
Figure 6:
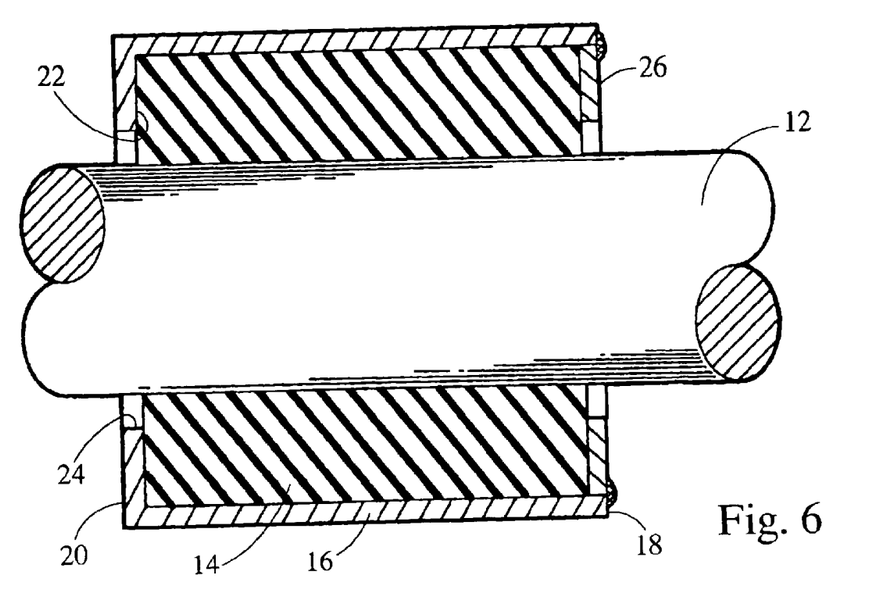
FIG. 6 is a side sectional view of the first preferred embodiment after the end cap has been welded to the bushing retainer.

Referring to FIGS. 3 through 6, in a first preferred embodiment, the bushing retainer 16 includes a first end 18 and a second end 20. The first end 18 is open, and the second end 20 provides an axial surface 22 which has an orifice 24 therethrough. The orifice 24 is adapted to receive the stabilizer bar 12. An and cap 26 is in axially compressive engagement with the bushing 14 and is secured within the bushing retainer 16 adjacent the first end 18. When the bushing assembly 13 is being assembled, the bushing retainer 16 is placed to the bushing 14 such that the bushing 14 rests against the axial surface 22 or the second end 20, as shown in FIG. 4. The end cap 26 is brought into engagement with the bushing 14 and forced into the open first end 18 of the bushing retainer 16, thereby compressing the bushing 14 therein. Once the bushing 14 is compressed to the desired stiffness, the end cap 26 is secured to the bushing retainer 16 to secure the compressed bushing 14 therein, as shown in FIGS. 5 and 6. As shown, the bushing assembly includes welds 28 to secure the end cap 26 within the bushing retainer 16; however, it is therethrough defining a inner diameter. The inner diamter of the bushing retainer 16 is large enough to accomadate the bushing 14. to be understood that other methods of attachment could be used without departing from the scope of the present invention.

Figure 7:
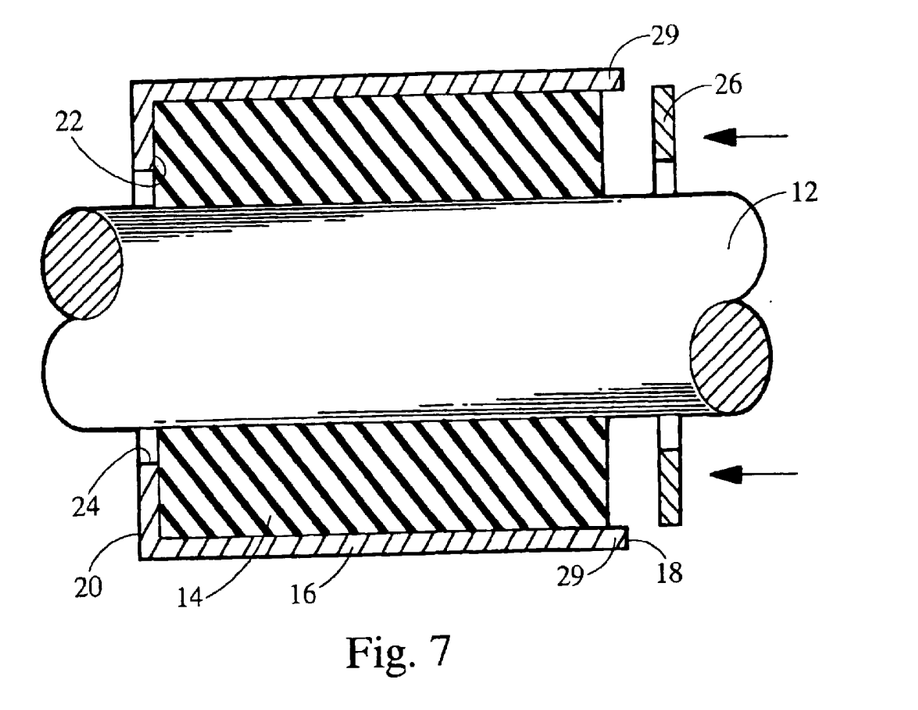
FIG. 7 is a side sectional view of a variation of the first preferred embodiment wherein the bushing retainer has flanges adapted to hold the endcap thereon.
Figure 8:
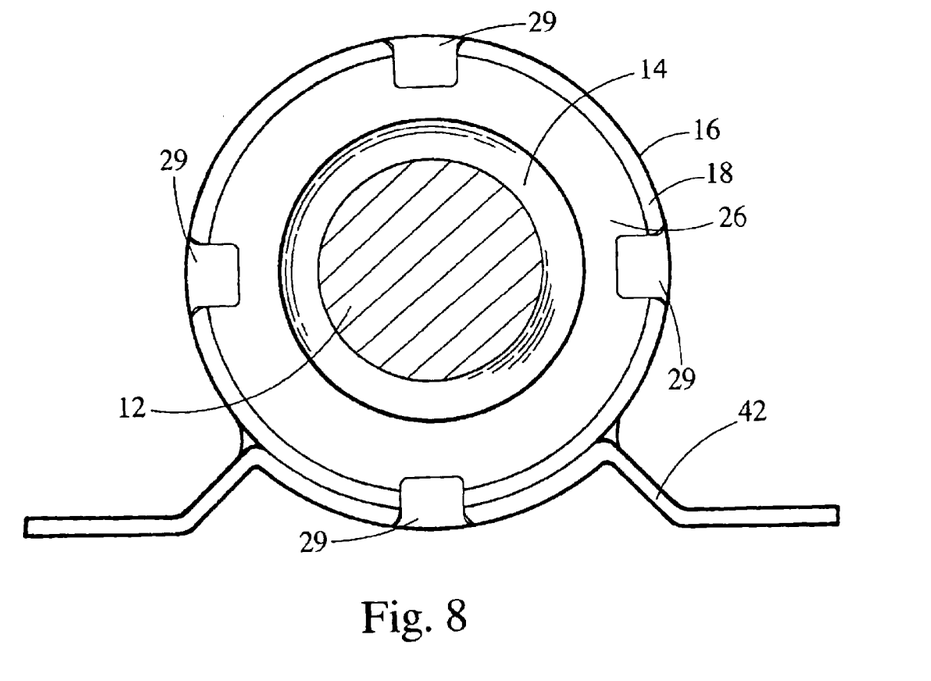
FIG. 8 is and end view of the variation shown in FIG. 7 after the flanges have been deformed over the end cap to secure the end cap to the bushing retainer.
Figure 9:
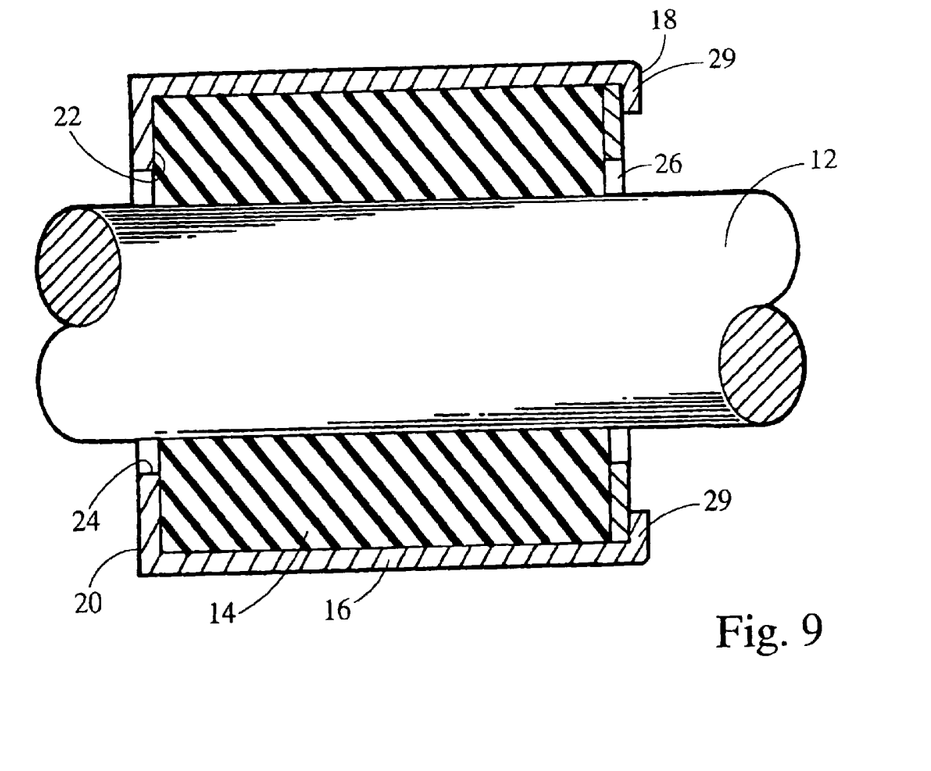
FIG. 9 is a side sectional view of the variation shown in FIG. 7 after the flanges have been deformed over the end cap to secure the end cap to the bushing retainer.

Referring to FIGS. 7, 8, and 9, in a variation of the first preferred embodiment the bushing retainer 16 includes a plurality of flanges 29 extending axially from the first end 18 of the bushing retainer 16. The end cap 26 is brought into engagement with the bushing 14 and forced into the open first end 18 of the bushing retainer 16, thereby compressing the bushing 14 therein. Once the bushing 14 is compressed to the desired stiffness, the flanges 29 are formed inward toward the shaft 12, overlapping the end cap 26 to secure the end cap, as shown in FIGS. 8 and 9.

Figure 10:
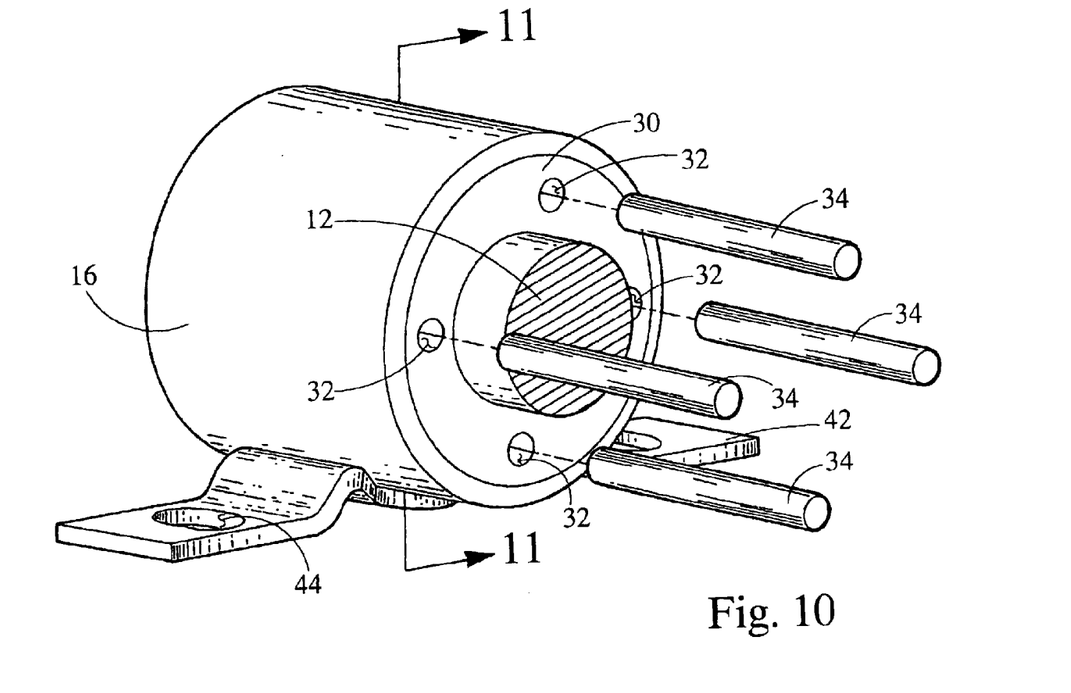
FIG. 10 is perspective view of a second preferred embodiment showing how inserts are placed within the bushing.
Figure 11:
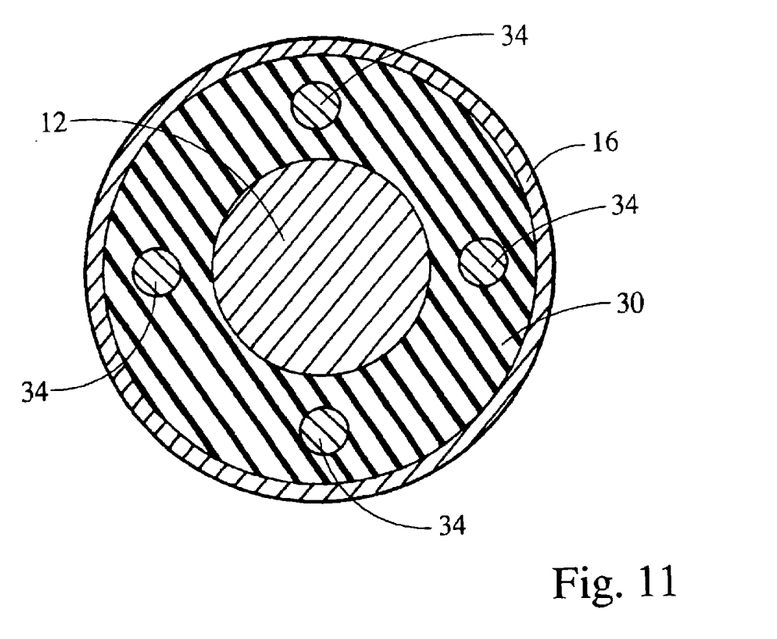
FIG. 11 is a sectional view taken along line 8—8 of FIG. 7 after the inserts have been placed to the bushing.

Referring to FIGS. 10 and 11, in a second preferred embodiment, a bushing 30 includes longitudinal cavities 32 formed therein. A solid insert 34 is positioned within each of the longitudinal cavities 32 to further compress the bushing 30 within the bushing retainer 16. Preferably, the inserts 34 have a cross sectional shape that closely matches the cross sectional shape of the longitudinal cavities 32, only slightly larger. Because the inserts 34 are slightly larger, when the inserts 34 are inserted within the longitudinal cavities 32, the inserts 34 will further compress the bushing 30 within the bushing retainer 16, thereby increasing the frictional engagement of the bushing 30 and the stabilizer bar 12.

Figure 12:
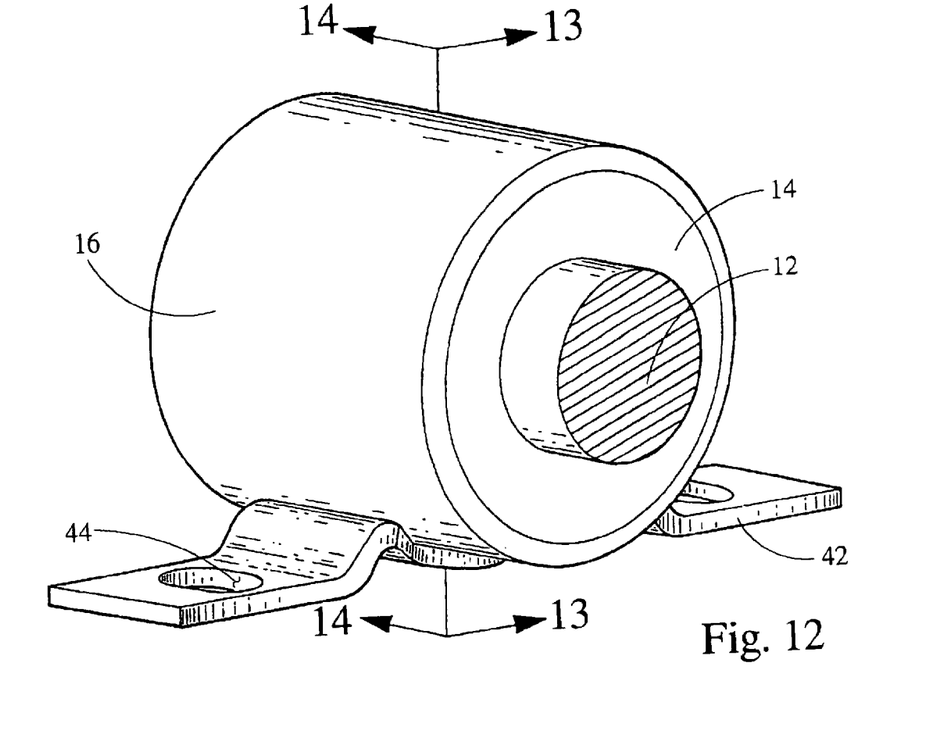
FIG. 12 is perspective view of a third preferred embodiment having fluid channels formed within the bushing.
Figure 13:
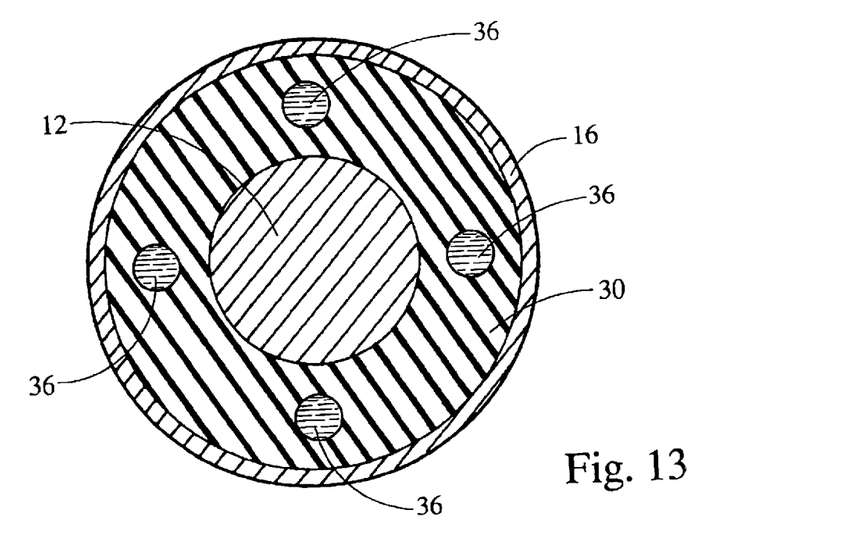
FIG. 13 is a sectional view taken along line 13—13 of FIG. 12.
Figure 14:
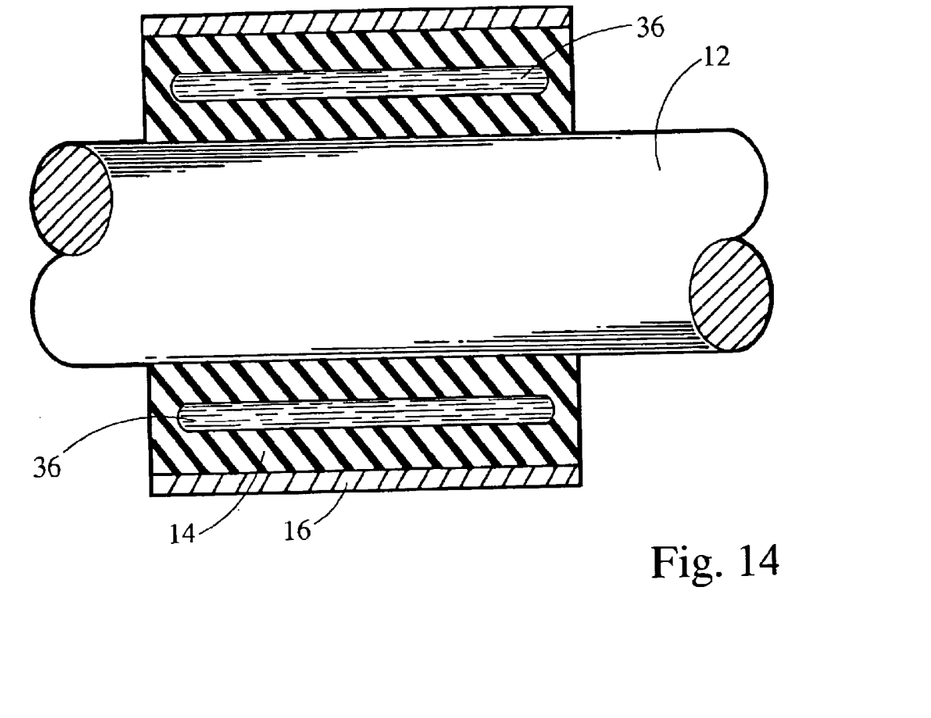
FIG. 14 is a sectional view taken along line 14—14 of FIG. 12.

Referring to FIGS. 12, 13, and 14, in a third preferred embodiment, the bushing 30 includes longitudinal cavities 32 formed therein. A fluid 36 fills each of the longitudinal cavities 32 to further compress the bushing 30 within the bushing retainer 16. Preferably, the fluid 36 is injected into the longitudinal cavities 32 at a relatively higher pressure. The higher the pressure of the fluid 36 within the longitudinal cavities 32, the more compressive force that is exerted upon the bushing 30 thereby increasing the frictional engagement between the bushing 30 and the stabilizer bar 12.

Figure 15:
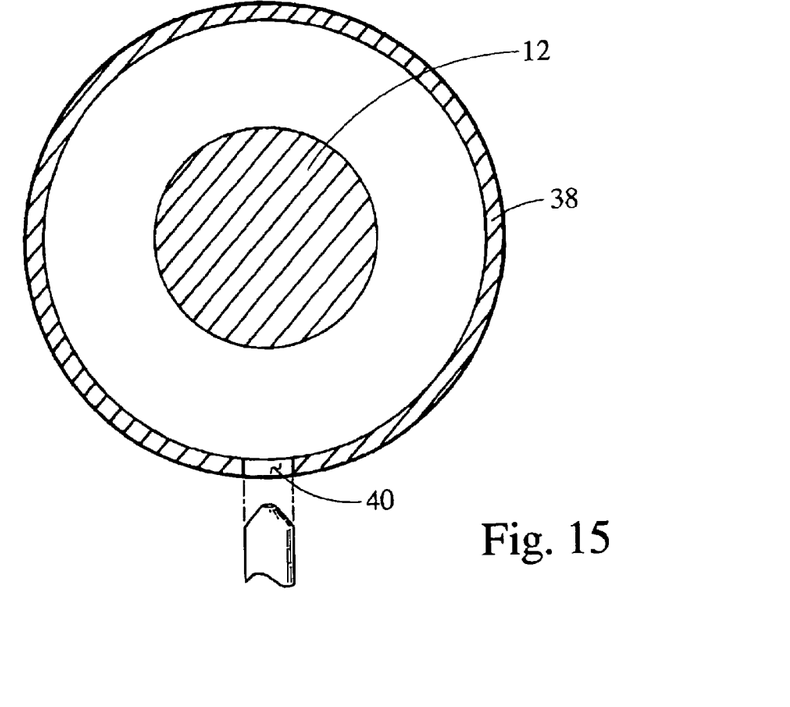
FIG. 15 is a sectional view of a fourth preferred embodiment prior to injecting the bushing material.
Figure 16:
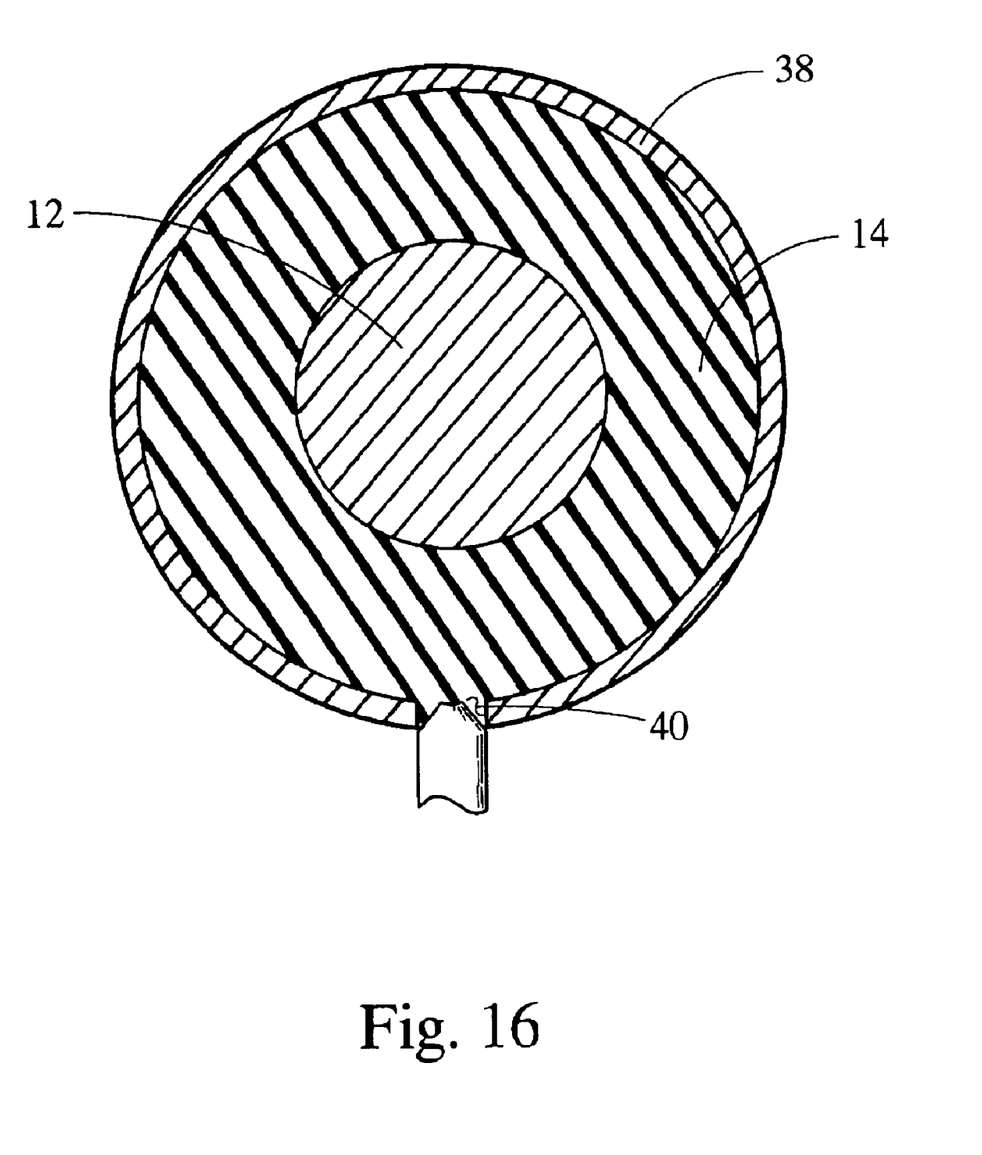
FIG. 16 is a sectional view similar to FIG. 15 after the bushing material has been injected.

Referring to FIGS. 15 and 16, in a fourth preferred embodiment, a bushing retainer 38 includes an orifice 40. The bushing retainer 38 is placed onto the stabilizer bar 12 before the bushing 14, and the bushing 14 is injected as a fluid into the bushing retainer 38. Preferably, the molten bushing material is injected at pressure and allowed to cool and solidify within the bushing retainer 38. Because the molten bushing material is pressurized when injected, the bushing 14 is under compression within the bushing retainer 38 after solidifying.

Referring again to FIGS. 1–3, a mounting bracket 42 is attached to the bushing retainer 16 to allow the bushing retainer 16 to be mounted to a structural component of the automobile. Preferably, the mounting bracket 42 includes mounting holes 44 that allow the mounting bracket 42 to be attached to the structure of an automobile. With the bushing 14 being made from a resilient material that allows limited movement of the stabilizer bar 12 relative to the bushing retainer 16, the bushing assembly 13 provides a spring rate and dampening of the torsional, radial, and axial movement of the stabilizer bar 12 relative to the structure of the vehicle. As shown, the mounting bracket 42 is attached to the bushing retainer 16 on a surface of the bushing retainer 16. This version works well with light duty applications. For heavier duty applications, the mounting bracket 42 can extend around the bushing retainer 16 to add strength to the assembly.

One advantage of the present invention is that the same stabilizer bar assembly 10 can be used for applications requiring different spring rates within the bushings 14. The effective spring rate of the bushings 14 will depend on the amount of compression that is exerted upon the bushing 14. The same assembly 10 can have different spring rates by simply modifying the pressure at which the bushing 14 is compressed. If the stabilizer bar assembly 10 is to be put into a vehicle which requires a soft suspension feel, then the bushing 14 can be compressed such that the bushing 14 provides a soft feel. If the stabilizer bar assembly 10 is to be installed in a vehicle requiring a stiff suspension, then the bushing 14 can be compressed to a higher degree, thereby providing a stiffer feel to the suspension.

Additionally, the stabilizer bar assembly 10 of the present invention will allow the bushings 14 to be repaired. Over time, as the bushings 14 loose some of their resiliency, their spring rate will change, causing the feel of the vehicle to change. In order to modify the spring rate, all that is required is to re-compress the bushing 14 to the desired compression pressure. This can be done by further compressing the bushing retainer 16 in the axial or radial direction, by injecting additional fluid 36 into the longitudinal cavities 32, or replacing the inserts 34 within the longitudinal cavities 32 with larger inserts 34. This will allow an older vehicle to have the suspension stiffness adjusted or repaired.

It is to be understood, that the methods of the first three preferred embodiments can be used in combination. For example, the bushing 14 can be compressed by the end cap 26 after inserts 34 have been placed within the bushing 14, or fluid 36 has been placed within cavities formed within the bushing 14. Additionally, the invention has been described in terms of a stabilizer bar, however it is to be understood that the bushing assembly and the method of inducing the compressive forces within the bushing can be applied to other suspension components such as control arms, torsion arms, etc.

The foregoing discussion discloses and describes four preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A suspension bar assembly for an automotive vehicle comprising:

a suspension bar;

a bushing mounted to said suspension bar;

a bushing retainer exerting radially and axially compressive forces onto said bushing such that said bushing is in frictional engagement with said suspension bar, thereby preventing relative movement of said bushing and said suspension bar and relative movement of said bushing and said bushing retainer;

said bushing retainer including a first end and a second end, said first end being open, and said second end having an orifice adapted to receive said suspension bar, said bushing retainer further including an end cap that is in axially compressive engagement with said bushing and is secured within said bushing retainer adjacent said first end; and a mounting bracket adapted to connect said suspension bar to the automotive vehicle.

2. suspension bar of claim 1 wherein said bushing is formed from an elastomeric material.

3. A suspension bar assembly for an automotive vehicle comprising:

a suspension bar;

a bushing mounted to said suspension bar;

a bushing retainer exerting radially and axially compressive forces onto said bushing such that said bushing is in frictional engagement with said suspension bar, thereby preventing relative movement of said bushing and said suspension bar and relative movement of said bushing and said bushing retainer; and a mounting bracket adapted to connect said suspension bar to the automotive vehicle; said bushing including a plurality of longitudinal cavities formed therein, each of said longitudinal cavities having a fluid positioned therein to further compress said bushing within said bushing retainer.

4. A method of inducing a pre-load onto a bushing that supports a bar including:

providing a bar;

placing a bushing onto the bar;

placing a bushing retainer about the bushing the bushing retainer having a first exterior dimension, wherein the bushing retainer is generally cylindrical having a first end that is open and a second end that includes an orifice adapted to receive the bar;

inducing axial forces upon the bushing by providing an end cap, placing the end cap against the bushing adjacent the open end, forcing the end cap into the bushing retainer, thereby compressing the bushing axially against the second end of the bushing retainer such that the bushing is forced into frictional engagement with the bar, and securing the end cap to the bushing retainer.

5. A method of inducing pre-load onto a bushing that supports a bar including:

providing a bar;

placing a bushing onto the bar, the bushing including longitudinal cavities formed therein;

placing a bushing retainer about the, bushing the bushing retainer having a first exterior dimension;

compressing the bushing within the bushing retainer by placing a fluid within the cavities to further compress the bushing within the bushing retainer such that the bushing is forced into frictional engagement with the bar.

6. A method of inducing a pre-load onto a bushing that supports a bar including:

providing a bar;

placing a bushing retainer about the bar, the bushing retainer including an orifice on an external radial surface;

injecting bushing material, in a molten state, into the bushing retainer under pressure, and allowing the bushing material to cool and solidify while still pressurized within the bushing retainer.

* * * * *

UNITED STATES PATENT AND TRADEMARK OFFICE
CERTIFICATE OF CORRECTION

PATENT NO. : 6,845,995 B2
DATED : January 25, 2005
INVENTOR(S) : Haimian Cai et al.

It is certified that error appears in the above-identified patent and that said Letters Patent is hereby corrected as shown below:

Column 6,
Line 17, immediately after "bushing" insert -- , -- (comma).
Line 18, delete "the, bushing" and substitute -- the bushing, -- in its place.

Signed and Sealed this

Thirty-first Day of May, 2005

JON W. DUDAS
*Director of the United States Patent and Trademark Office*